US012158452B2

(12) United States Patent
Otsubo et al.

(10) Patent No.: US 12,158,452 B2
(45) Date of Patent: Dec. 3, 2024

(54) FLOW PASSAGE SWITCHING VALVE AND LIQUID CHROMATOGRAPH HAVING THE SAME

(71) Applicant: HITACHI HIGH-TECH CORPORATION, Tokyo (JP)

(72) Inventors: Ayano Otsubo, Tokyo (JP); Hisao Inami, Tokyo (JP); Nobuhiro Tsukada, Tokyo (JP); Daisuke Akieda, Tokyo (JP); Kenichiro Nishiki, Tokyo (JP); Yoshihiro Nagaoka, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 463 days.

(21) Appl. No.: 17/427,757

(22) PCT Filed: Dec. 2, 2019

(86) PCT No.: PCT/JP2019/046960
§ 371 (c)(1),
(2) Date: Aug. 2, 2021

(87) PCT Pub. No.: WO2020/179157
PCT Pub. Date: Sep. 10, 2020

(65) Prior Publication Data
US 2021/0382018 A1    Dec. 9, 2021

(30) Foreign Application Priority Data
Mar. 7, 2019  (JP) .................................. 2019-041379

(51) Int. Cl.
*G01N 30/32*   (2006.01)
*F16K 11/074*  (2006.01)
*G01N 30/02*   (2006.01)

(52) U.S. Cl.
CPC .......... *G01N 30/32* (2013.01); *F16K 11/0743* (2013.01); *G01N 2030/027* (2013.01); *G01N 2030/328* (2013.01)

(58) Field of Classification Search
CPC ............. G01N 30/32; G01N 2030/027; G01N 2030/328; G01N 2030/202; F16K 11/0743; F16K 37/0058
See application file for complete search history.

(56) References Cited

U.S. PATENT DOCUMENTS

| 2002/0178843 | A1  | 12/2002 | Kriel |
| 2009/0050212 | A1* | 2/2009  | Dourdeville ........... G01N 30/20 137/625.46 |
| 2012/0103887 | A1  | 5/2012  | Maeda et al. |

FOREIGN PATENT DOCUMENTS

| CN | 113271043 A | * | 8/2021  | ................ H02P 6/16 |
| JP | 9-264279 A  |   | 10/1997 | |

(Continued)

OTHER PUBLICATIONS

Extended European Search Report received in corresponding European Application No. 19918087.8 dated Nov. 14, 2022.

(Continued)

*Primary Examiner* — Catherine T. Rastovski
*Assistant Examiner* — Drexel Alejandro Venero
(74) *Attorney, Agent, or Firm* — MATTINGLY & MALUR, PC

(57) ABSTRACT

A liquid chromatograph has a long-life flow passage switching valve with reduced abrasion caused by sliding of flow passage end portions of a stator and flow passage end portions of a rotor seal. The flow passage switching valve includes: a stator; and a rotor seal connected with a rotor configured to rotate and slide on a circumference with respect to the stator. The stator has stator flow passages that open to the rotor seal. The rotor seal has a rotor seal flow (Continued)

passage for coupling two or more of the stator flow passages. A flow passage end portion that is positioned at a tip end in a sliding direction of the rotor seal flow passage is positioned in a direction opposite to the sliding direction of the stator flow passage end portion to be connected to the rotor seal flow passage, at least at the start of sliding.

6 Claims, 14 Drawing Sheets

(56) References Cited

FOREIGN PATENT DOCUMENTS

| JP | 2012-230116 A | 11/2012 |
| JP | 2014-095613 A | 5/2014 |
| JP | 5573838 B2 | 8/2014 |

OTHER PUBLICATIONS

International Search Report of PCT/JP2019/046960 dated Mar. 3, 2020.

* cited by examiner

[FIG. 1A]
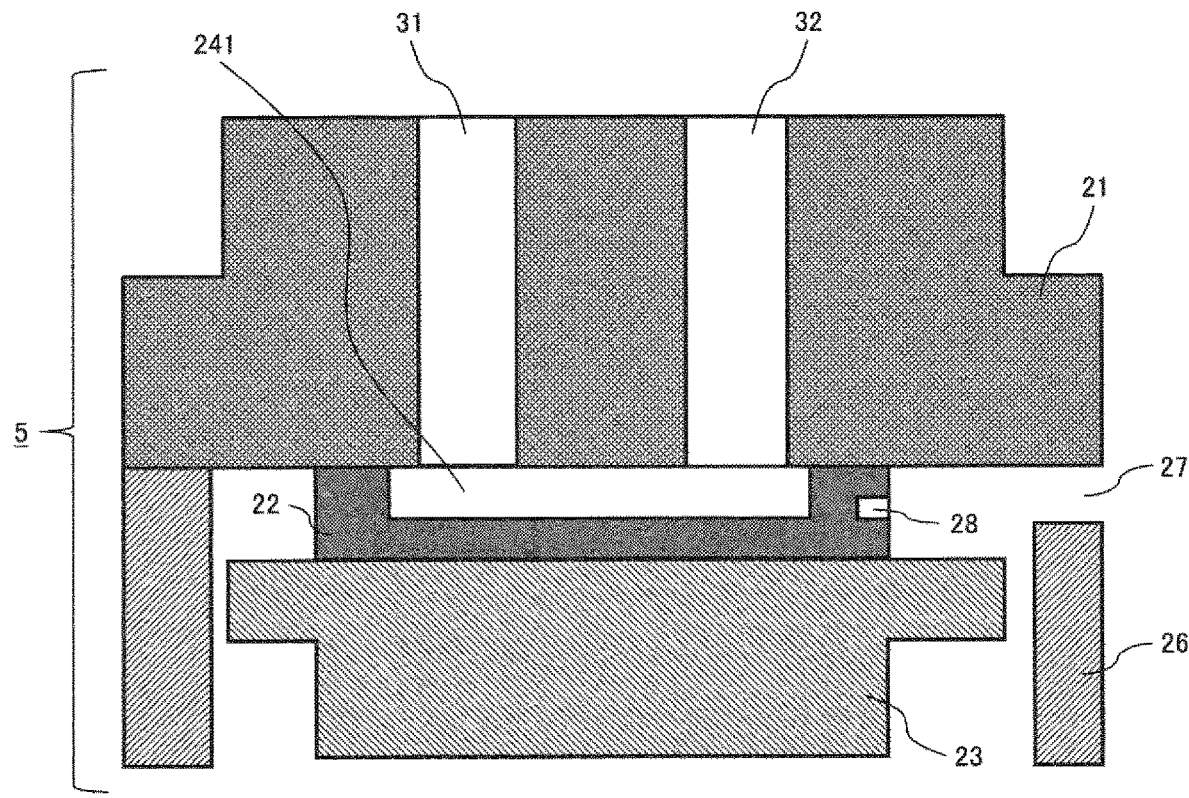
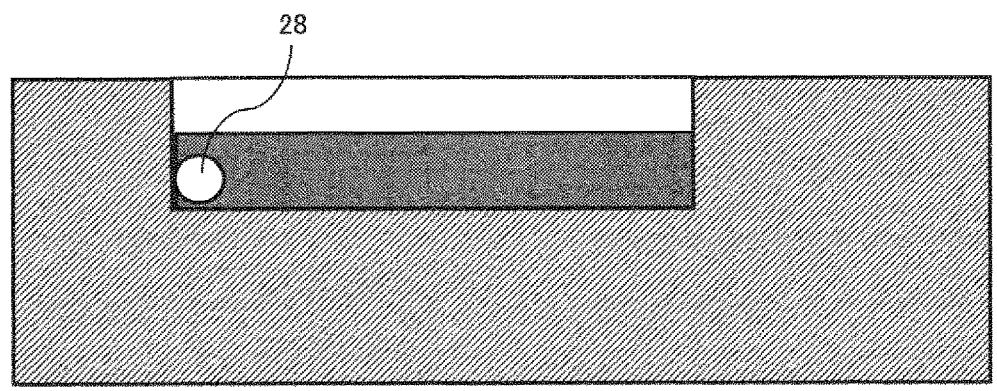

[FIG. 1B]
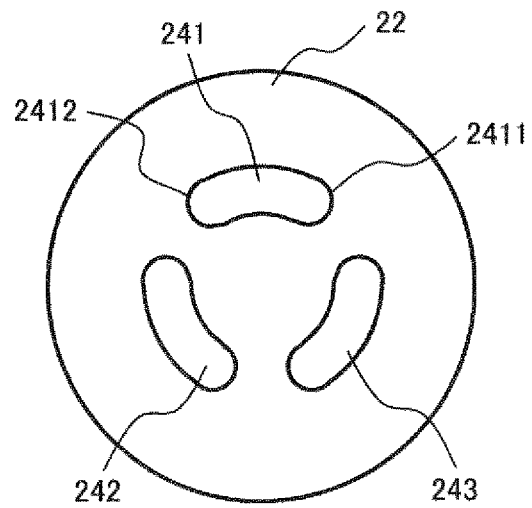
[FIG. 1C]
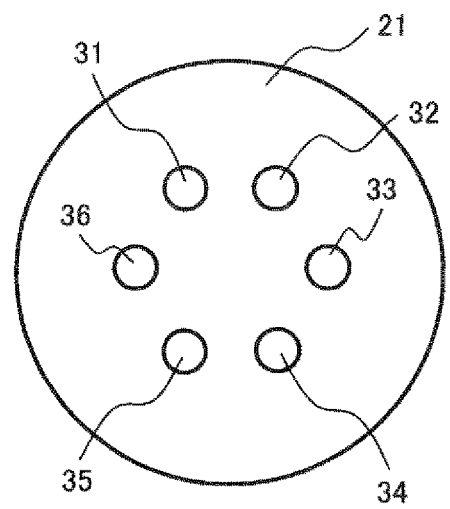

[FIG. 1D]
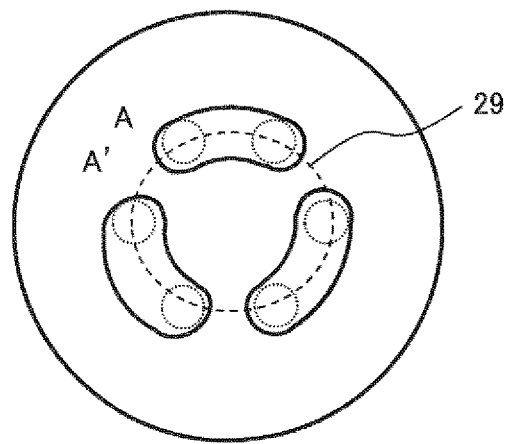
[FIG. 2A]
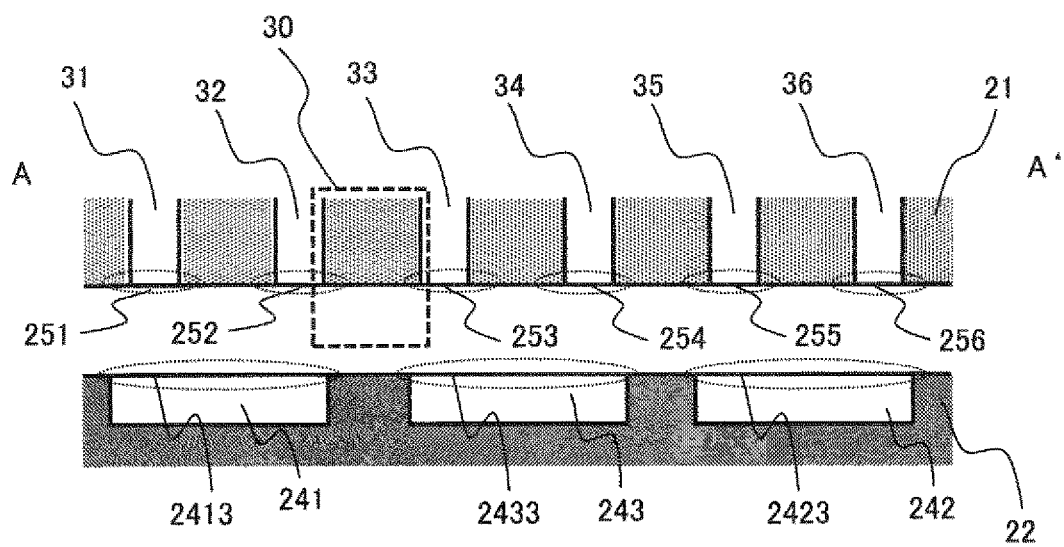

[FIG. 2B]
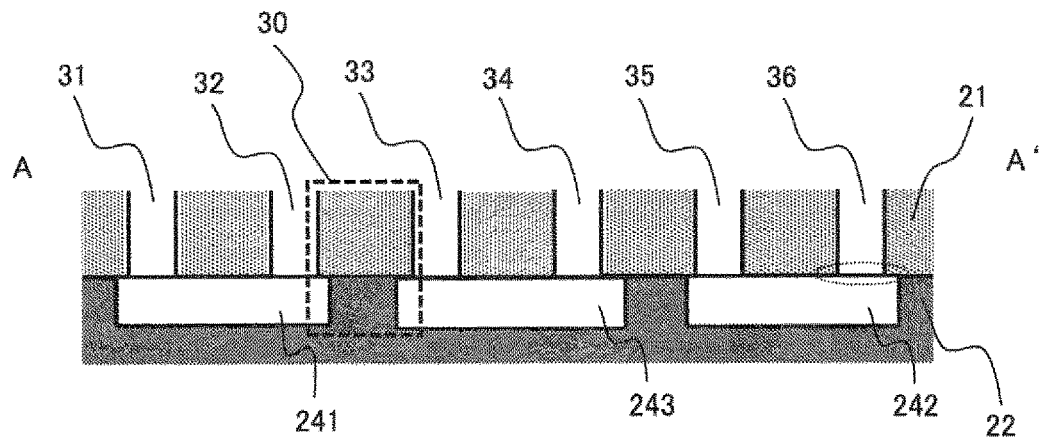
[FIG. 2C]
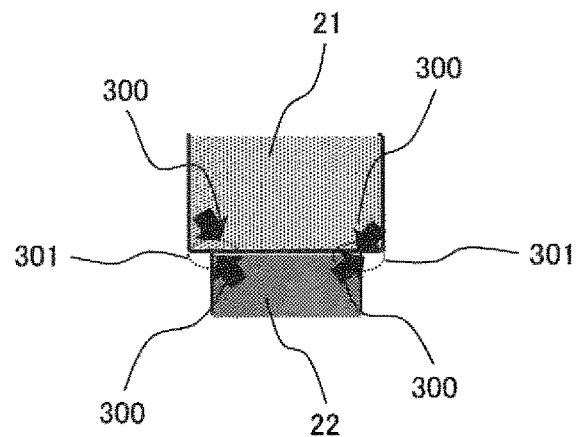
[FIG. 3A]
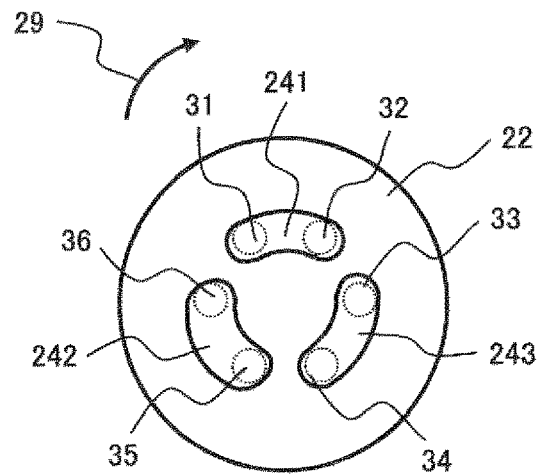

[FIG. 3B]
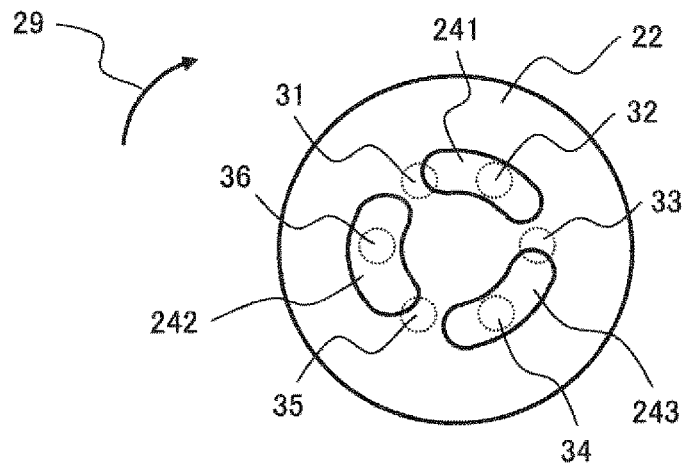
[FIG. 3C]
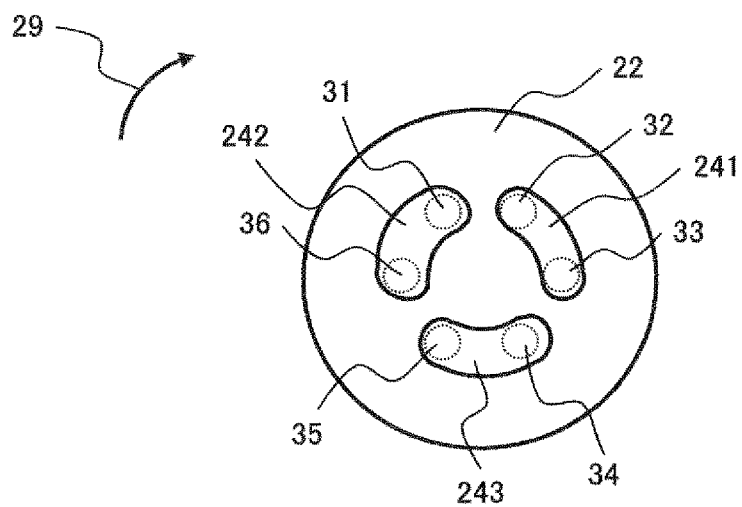

[FIG. 4A]
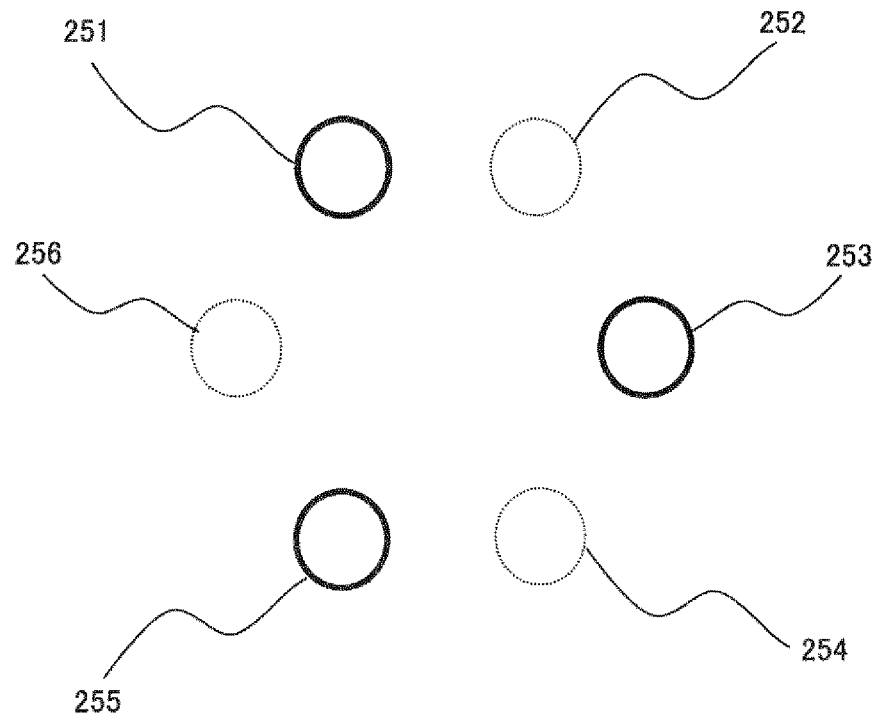
[FIG. 4B]
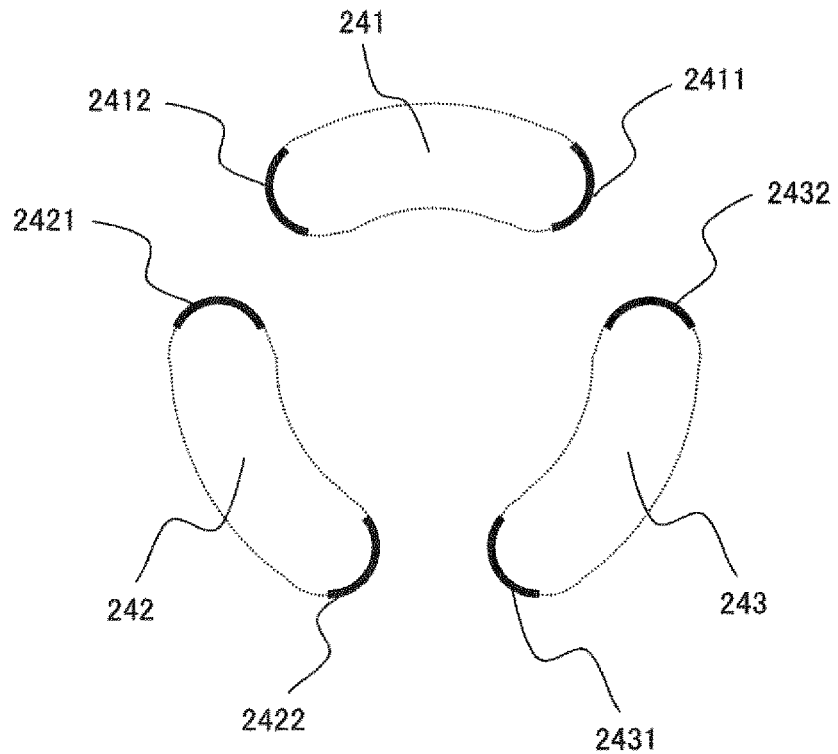

[FIG. 5A]
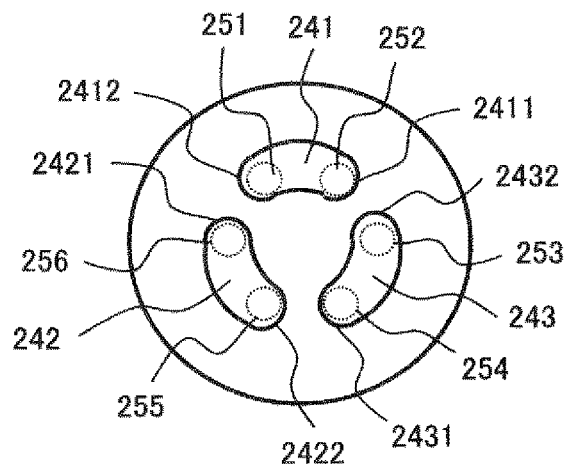
[FIG. 5B]
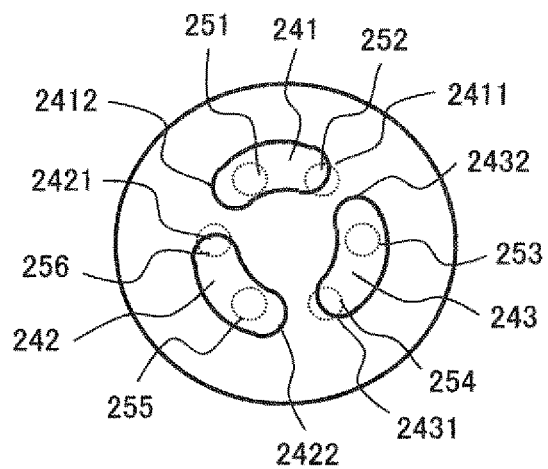

[FIG. 5C]
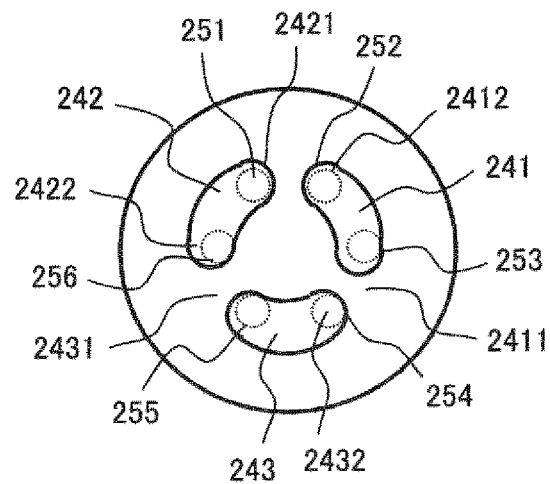
[FIG. 5D]
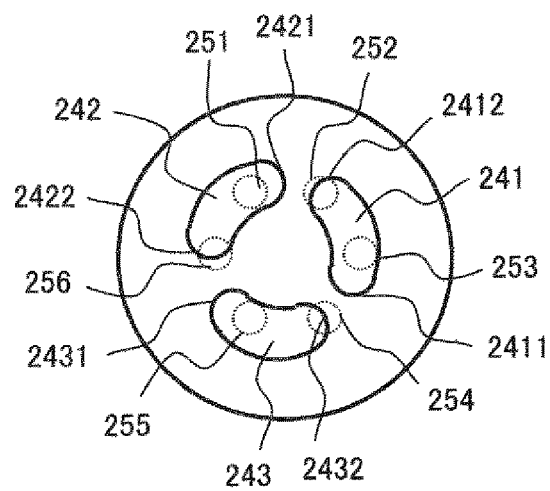

[FIG. 6A]
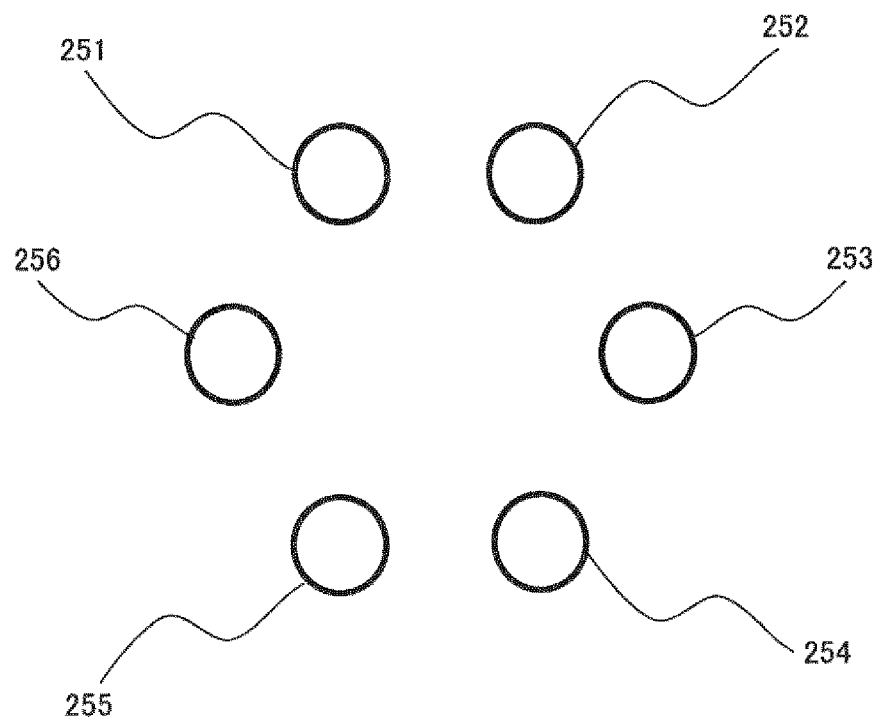
[FIG. 6B]
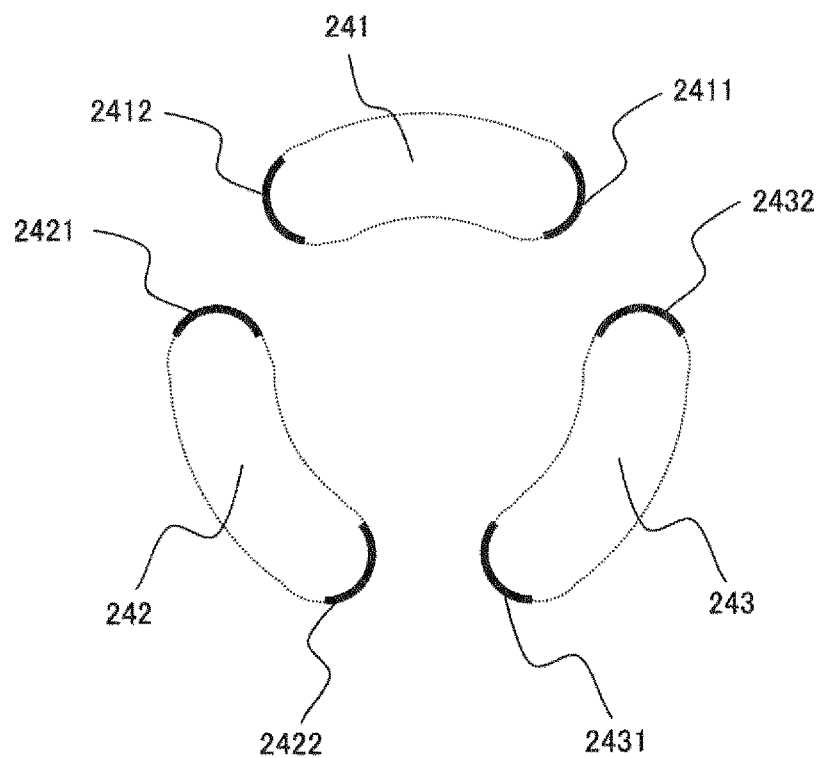

[FIG. 7A]
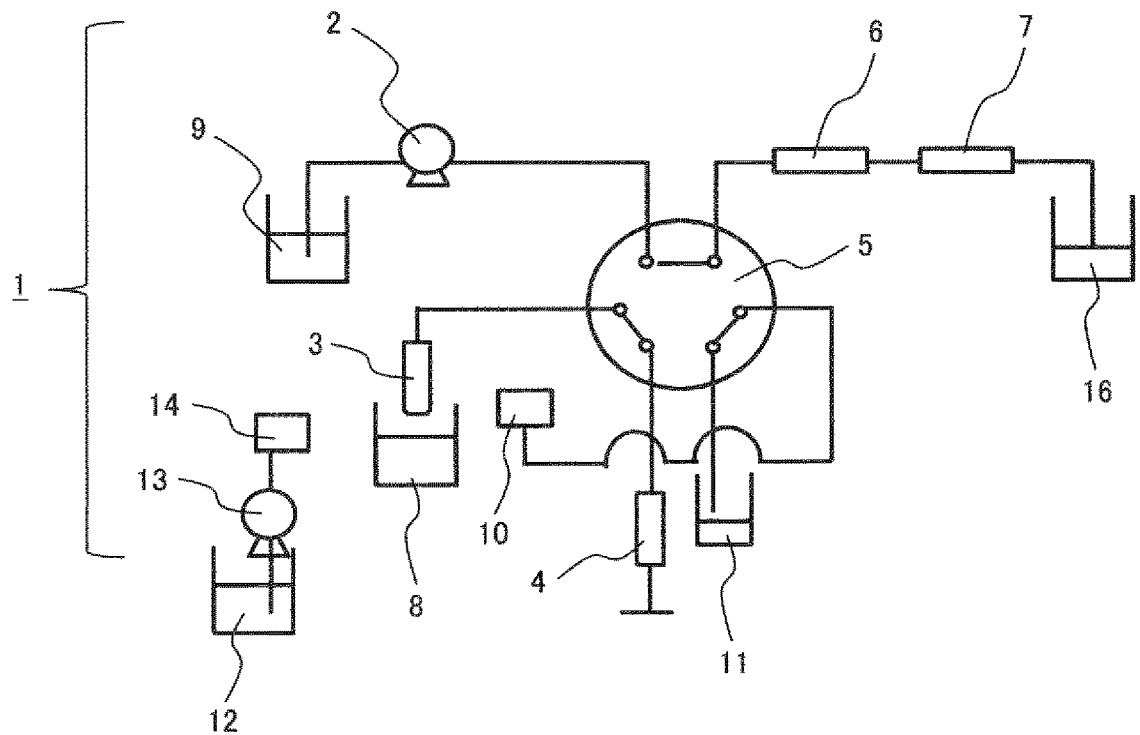
[FIG. 7B]
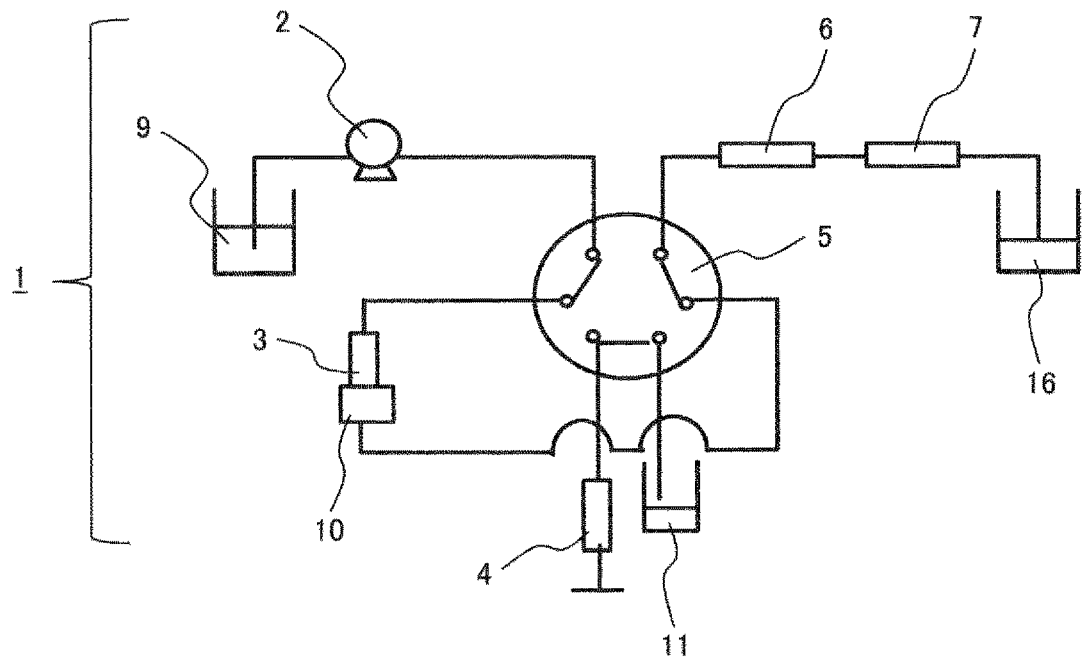

[FIG. 8A]
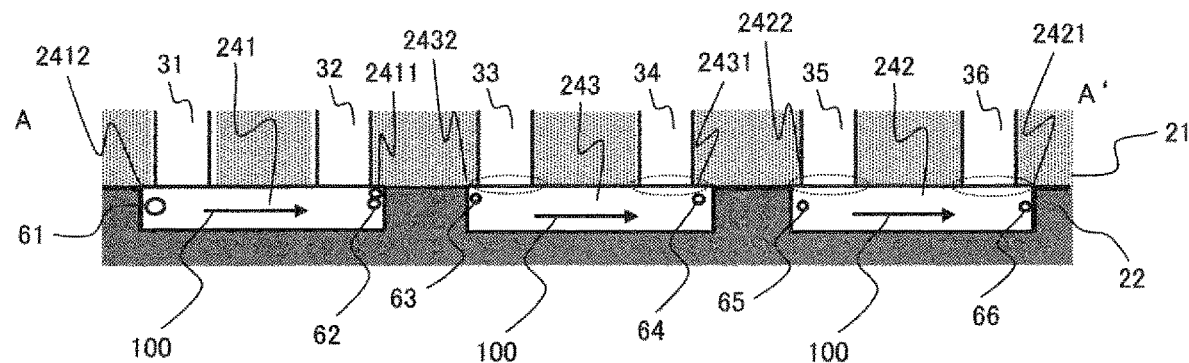
[FIG. 8B]
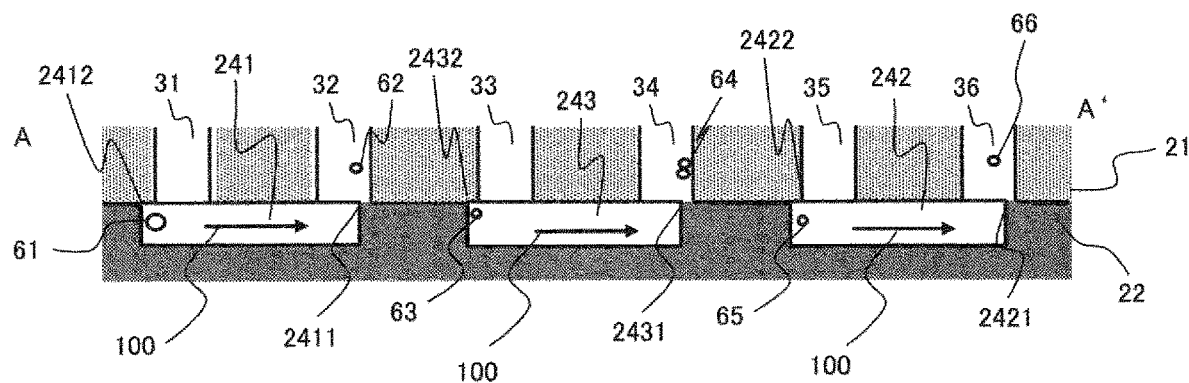
[FIG. 8C]
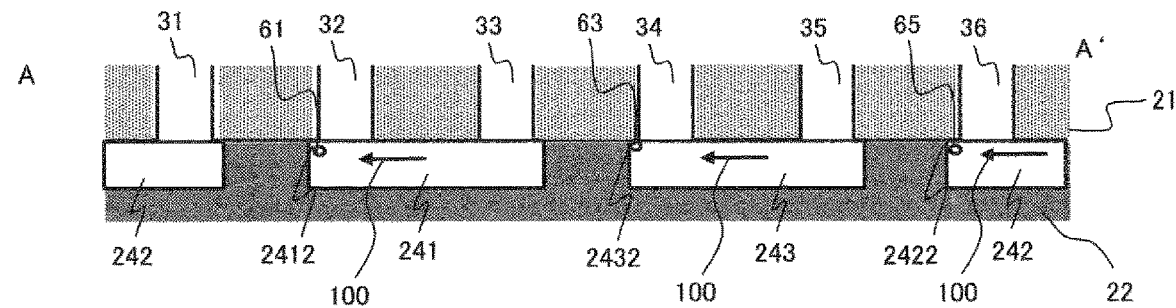

[FIG. 8D]
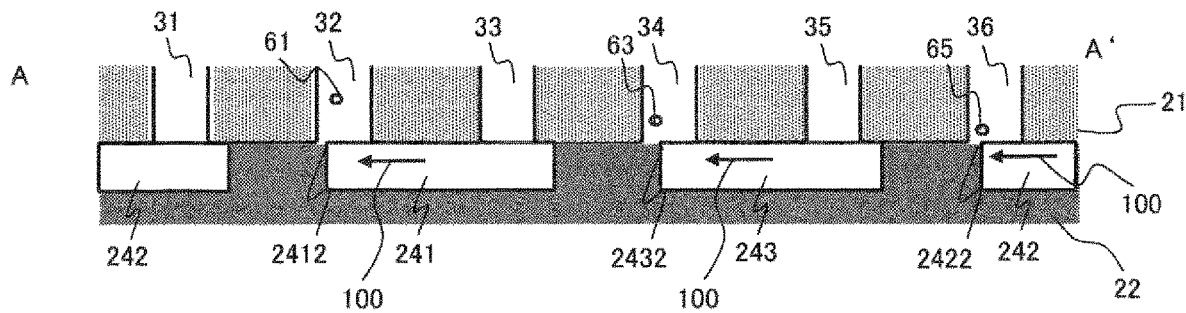
[FIG. 9]
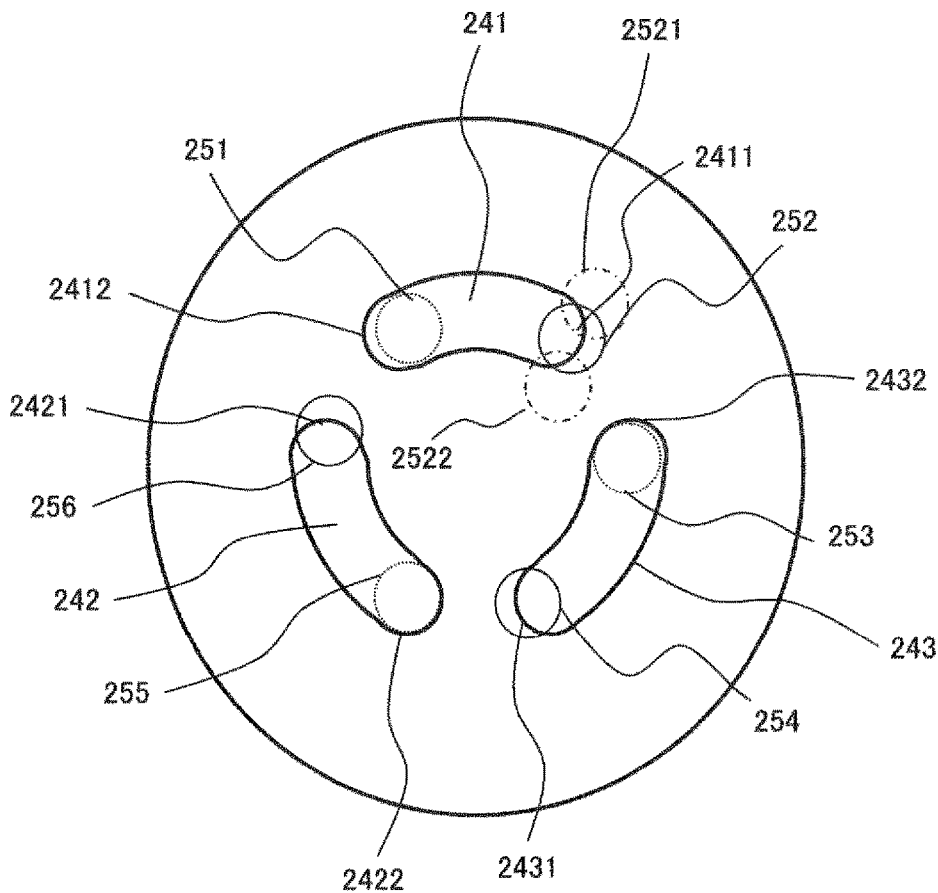

[FIG. 10A]
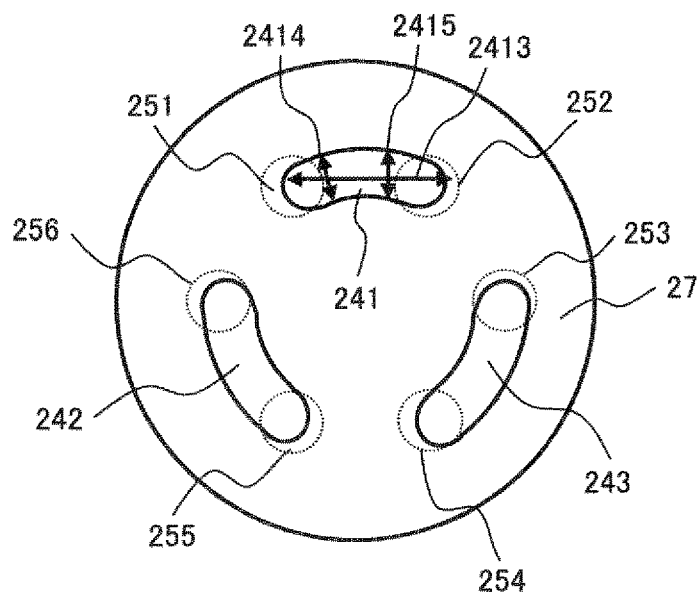
[FIG. 10B]
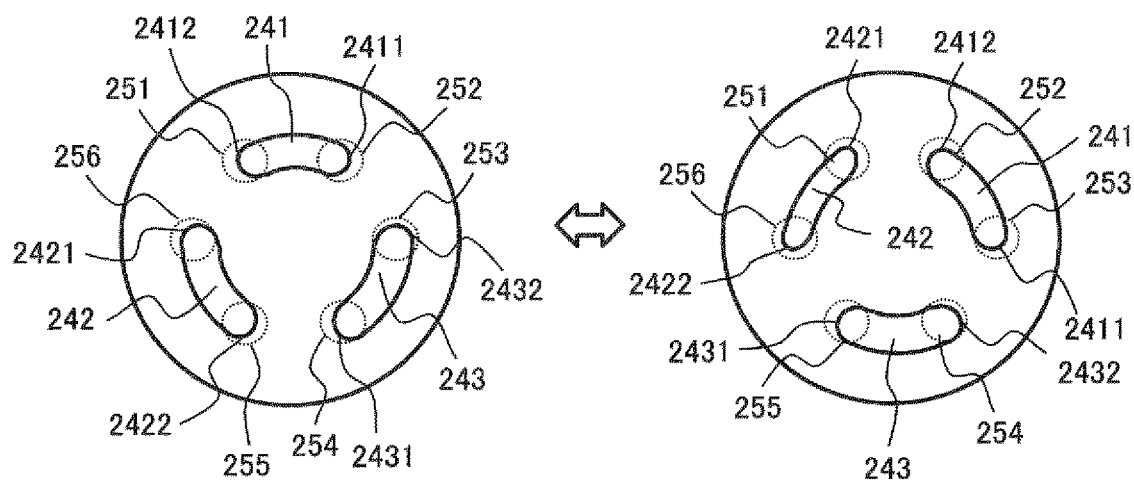

[FIG. 11A]
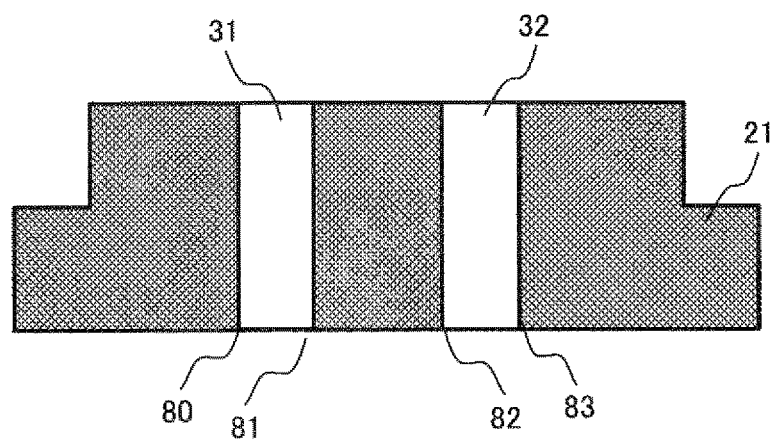
[FIG. 11B]
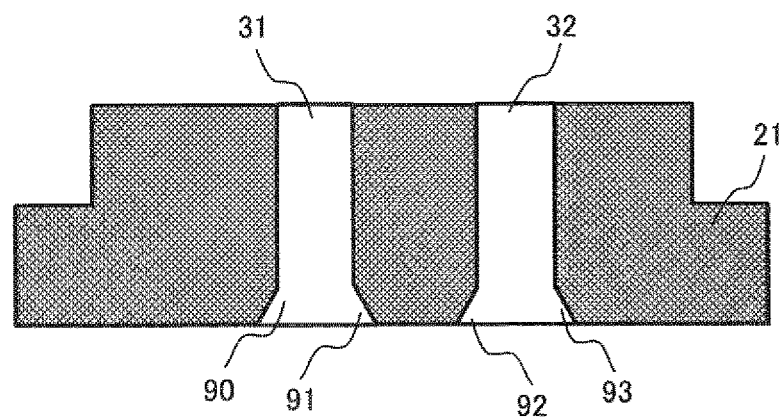

FLOW PASSAGE SWITCHING VALVE AND LIQUID CHROMATOGRAPH HAVING THE SAME

TECHNICAL FIELD

The present invention relates to a flow passage switching valve of an analyzer such as a liquid chromatograph, and a liquid chromatograph including the flow passage switching valve.

BACKGROUND ART

A flow passage switching valve includes a stator that connects a pipe, a rotor seal, a rotor that rotates the rotor seal, and a housing that holds these members. The rotor is supported by a spring or the like. The rotor seal is pressed against the stator by the rotor so that liquid tightness of a rotor seal flow passage and a stator flow passage is maintained. The rotor seal is fixed to the rotor with a pin, and is rotated by a motor connected to the rotor to switch a flow passage. The flow passage switching valve that switches multiple flow passages is mounted on an analyzer such as a liquid chromatograph.

The rotor seal of the flow passage switching valve rotates and slides while being pressed against the stator by the rotor, and thus flow passage end portions of the rotor seal and the stator may be abrased and the life may be shortened. PTL 1 discloses a flow passage switching valve having a structure that prevents abrasion of the flow passage end portion, for example.

The flow passage switching valve disclosed in PTL 1 includes a stator and a rotor that has a surface in contact with one surface of the stator and rotates while sliding on the contact surface. The stator includes a plurality of liquid flow ports opening to the contact surface. The rotor includes a plurality of flow passage grooves connecting the liquid flow ports, and one flow passage groove into which a mobile phase solution flows in a load state and an injection state surrounds a rotation center of the rotor to be positioned on two sides with the rotation center of the rotor interposed therebetween. The flow passage switching valve is configured such that a flow passage groove connecting a high-pressure liquid flow port is positioned on the two sides with the rotation center of the rotor interposed therebetween. With such a configuration, it is possible to reduce a local load applied to the rotor and reduce an inclination of the rotor since a high-pressure liquid flows into the two sides with the rotation center of the rotor interposed therebetween. Therefore, it is possible to prevent the contact surface from being scraped by an edge of a port opening at the time of rotor rotation, and it is possible to prevent the life of the rotor from being shortened due to local abrasion.

CITATION LIST

Patent Literature

PTL 1: Japanese Patent No. 5573838

SUMMARY OF INVENTION

Technical Problem

However, in the flow passage switching valve disclosed in PTL 1, since a portion where the flow passage end portion of the stator and the flow passage end portion of the rotor seal are in contact with each other is concentrated, the life of the stator and the rotor seal may be shortened and the life of the flow passage switching valve may be shortened.

Therefore, the invention provides a long-life flow passage switching valve that reduces abrasion caused by sliding of flow passage end portions of a stator and flow passage end portions of a rotor seal, and a liquid chromatograph having the flow passage switching valve.

Solution to Problem

To solve the above problems, a flow passage switching valve according to the invention includes: a stator; and a rotor seal connected with a rotor configured to rotate and slide on a circumference with respect to the stator. The stator has a plurality of stator flow passages that open to the rotor seal. The rotor seal has a rotor seal flow passage for coupling two or more stator flow passages among the plurality of stator flow passages. Among rotor seal flow passage end portions, a flow passage end portion that is positioned at a tip end in a sliding direction of the rotor seal flow passage is positioned in a direction opposite to the sliding direction of the stator flow passage end portion to be connected to the rotor seal flow passage, at least at the start of sliding.

A liquid chromatograph according to the invention includes: a liquid feeding pump; a needle; a syringe pump; a flow passage switching valve; a flow separation column; and a detector. The flow passage switching valve includes: a stator; and a rotor seal connected with a rotor configured to rotate and slide on a circumference with respect to the stator. The stator has a plurality of stator flow passages that open to the rotor seal. The rotor seal has a rotor seal flow passage for coupling two or more stator flow passages among the plurality of stator flow passages. Among rotor seal flow passage end portions, a flow passage end portion that is positioned at a tip end in a sliding direction of the rotor seal flow passage is positioned in a direction opposite to the sliding direction of the stator flow passage end portion to be connected to the rotor seal flow passage, at least at the start of sliding.

Advantageous Effect

According to the invention, it is possible to provide a long-life flow passage switching valve that reduces abrasion caused by sliding of flow passage end portions of a stator and flow passage end portions of a rotor seal, and a liquid chromatograph having the flow passage switching valve.

Problems to be solved, configurations, and effects other than those described above will be clarified by the following description of embodiments.

BRIEF DESCRIPTION OF DRAWINGS

FIG. 1A is a cross-sectional view of a flow passage switching valve according to a first embodiment of the invention.

FIG. 1B is a top view of a rotor seal configuring the flow passage switching valve shown in FIG. 1A.

FIG. 1C is a top view of a portion, that contacts the rotor seal, of a stator configuring the flow passage switching valve shown in FIG. 1A.

FIG. 1D is a top view of a contact surface between the stator and the rotor seal configuring the flow passage switching valve shown in FIG. 1A.

FIG. 2A is a cross-sectional view before stator flow passages and rotor seal flow passages contact each other.

FIG. 2B is a cross-sectional view when the stator flow passages and the rotor seal flow passages contact each other.

FIG. 2C is an enlarged view of a contact portion between the stator flow passage and the rotor seal flow passage.

FIG. 3A is an illustrative view of an operation of a flow passage switching valve in related art.

FIG. 3B is an illustrative view of an operation of the flow passage switching valve in related art.

FIG. 3C is an illustrative view of an operation of the flow passage switching valve in related art.

FIG. 4A is an illustrative view of abrasion portions of the flow passage switching valve in related art.

FIG. 4B is an illustrative view of abrasion portions of the flow passage switching valve in related art.

FIG. 5A is an illustrative view of an operation of the flow passage switching valve of the first embodiment.

FIG. 5B is an illustrative view of an operation of the flow passage switching valve of the first embodiment.

FIG. 5C is an illustrative view of an operation of the flow passage switching valve of the first embodiment.

FIG. 5D is an illustrative view of an operation of the flow passage switching valve of the first embodiment.

FIG. 6A is an illustrative view of abrasion portions of the flow passage switching valve of the first embodiment.

FIG. 6B is an illustrative view of abrasion portions of the flow passage switching valve of the first embodiment.

FIG. 7A is a schematic diagram of a flow passage in an initial state of a liquid chromatograph having the flow passage switching valve of the first embodiment.

FIG. 7B is a diagram showing a state in which the flow passage switching valve rotates clockwise from the initial state of the liquid chromatograph having the flow passage switching valve of the first embodiment.

FIG. 8A is an illustrative view of a cleaning process of the flow passage switching valve of the first embodiment.

FIG. 8B is an illustrative view of the cleaning process of the flow passage switching valve of the first embodiment.

FIG. 8C is an illustrative view of the cleaning process of the flow passage switching valve of the first embodiment.

FIG. 8D is an illustrative view of the cleaning process of the flow passage switching valve of the first embodiment.

FIG. 9 is a top view of a contact surface between a stator and a rotor seal of a flow passage switching valve according to a second embodiment of the invention.

FIG. 10A is a top view of a contact surface between a stator and a rotor seal of a flow passage switching valve according to a third embodiment of the invention.

FIG. 10B is a view of a switching operation of the flow passage switching valve according to the third embodiment.

FIG. 11A is a cross-sectional view of the stator of the flow passage switching valve of the first embodiment.

FIG. 11B is a cross-sectional view of a stator of a flow passage switching valve according to a fourth embodiment of the invention.

DESCRIPTION OF EMBODIMENTS

Hereinafter, embodiments of the invention will be described with reference to the drawings. The invention is not limited to the embodiments described below.

First Embodiment

FIG. 1A is a cross-sectional view of a flow passage switching valve of a first embodiment according to one embodiment of the invention. FIG. 1B is a top view of a rotor seal constituting the flow passage switching valve shown in FIG. 1A. FIG. 1C is a top view of a portion, which is in contact with the rotor seal, of a stator constituting the flow passage switching valve shown in FIG. 1A. FIG. 1D is a top view of a contact surface between the stator and the rotor seal constituting the flow passage switching valve shown in FIG. 1A.

As shown in an upper view of FIG. 1A, a flow passage switching valve 5 includes a stator 21 that connects a pipe, a rotor seal 22, a rotor 23 that rotates the rotor seal 22, and a housing 26 that holds the stator 21 and the rotor 23. The roller 23 is supported by a spring or the like (not shown). The stator 21 is usually made of metal or ceramic. The rotor seal 22 is made of metal, ceramic, or resin. It is desirable to coat the stator 21 and the rotor seal 22 with diamond-like carbon in order to improve an abrasion resistance performance. Here, as shown in the upper view and a lower view of FIG. 1A, a positioning window 27 is provided in a part of the housing 26, and is set as an initial value of positioning by a positioning hole 28 provided in a part of the rotor seal 22. The positioning hole 28 is not limited to a circular shape, and may be a concave portion having a rectangular shape.

The rotor seal 22 is pressed against the stator 21 by the rotor 23 so that liquid tightness between a rotor seal flow passage 241 and a stator flow passage 31 and a stator flow passage 32, liquid tightness between a rotor seal flow passage 242 and a stator flow passage 35 and a stator flow passage 36, and liquid tightness between a rotor seal flow passage 243 and a stator flow passage 33 and a stator flow passage 34 are maintained. The rotor seal 22 is fixed to the rotor 23 by a pin (not shown) and is rotated by a motor (not shown) connected to the rotor 23.

By the rotation of the rotor seal 22, connection of the three rotor seal flow passages shown in FIG. 1B including the rotor seal flow passage 241, the rotor seal flow passage 242, and the rotor seal flow passage 243, and the six stator flow passages shown in FIG. 1C including the stator flow passage 31, the stator flow passage 32, the stator flow passage 33, the stator flow passage 34, the stator flow passage 35, and the stator flow passage 36 is switched. When the stator 21 and the rotor seal 22 come into contact with each other, a result is as shown in FIG. 1D.

FIG. 2 is an exploded view of a cross section of the stator flow passages and the rotor seal flow passages. A position of the cross section is indicated by a broken line 29 in FIG. 1D. As shown in FIG. 2A, when a stator flow passage end portion 251, a stator flow passage end portion 252, a stator flow passage end portion 253, a stator flow passage end portion 254, a stator flow passage end portion 255, and a stator flow passage end portion 256 of the stator 21, a rotor seal flow passage end portion 2413, a rotor seal flow passage end portion 2423, and a rotor seal flow passage end portion 2433 of the rotor seal 22 come into contact with each other as shown in FIG. 2B, the liquid tightness of the stator flow passages 31 to 36 and the rotor seal flow passages 241 to 243 is maintained.

FIG. 2C is an enlarged view of a contact portion 30 of FIG. 2B. As indicated by black arrows in FIG. 2C, loads 300 applied to flow passage end portions are concentrated on the stator flow passage end portion 251, the stator flow passage end portion 252, the stator flow passage end portion 253, the stator flow passage end portion 254, the stator flow passage end portion 255, the stator flow passage end portion 256, the rotor seal flow passage end portion 2413, the rotor seal flow passage end portion 2423, and the rotor seal flow passage end portion 2433 in FIG. 2B.

Here, a positional relationship between stator flow passages and rotor seal flow passages when a rotor seal is rotated in the related art will be described with reference to FIGS. 3A, 3B, and 3C. From a state of FIG. 3A, the rotor seal 22 is rotated by 60 degrees in a sliding direction 29 in the clockwise direction, the process proceeds to FIG. 3C through FIG. 3B. In other words, from the state shown in FIG. 3A, the rotor seal 22 is rotated by 60 degrees in the sliding direction 29 in a right turn direction and the process proceeds to FIG. 3C through FIG. 3B. The connection of the rotor seal flow passage 241 with the stator flow passage 31 and the stator flow passage 32 is switched to the connection with the stator flow passage 32 and the stator flow passage 33. The connection of the rotor seal flow passage 242 with the stator flow passage 35 and the stator flow passage 36 is switched to the connection with the stator flow passages 36 and 31. The connection of the rotor seal flow passage 243 with the stator flow passage 33 and the stator flow passage 34 is switched to the connection with the stator flow passage 34 and the stator flow passage 35.

From a state of FIG. 3C, the rotor seal 22 is rotated by 60 degrees in a counterclockwise direction (left turn direction), the process proceeds to FIG. 3A through FIG. 3B. In this way, a switching operation of 60 degrees in the clockwise direction and 60 degrees in the counterclockwise direction is repeated. In other words, the switching operation of 60 degrees in the right turn direction and 60 degrees in the left turn direction is repeated.

FIG. 4A shows portions where stator flow passage end portions are scraped when the switching operation of FIG. 3 is performed. FIG. 4B shows portions where rotor seal flow passage end portions are scraped when the operation of FIG. 3 is performed.

As shown in FIGS. 4A and 4B, when the switching operation is performed, a flow passage end portion 2411 at a tip end in the rotor seal flow passage sliding direction is brought into contact with the stator flow passage end portion 253 twice, a flow passage end portion 2412 at a tip end in the rotor seal flow passage sliding direction is brought into contact with the stator flow passage end portion 251 twice, a flow passage end portion 2432 at a tip end in the rotor seal flow passage sliding direction is brought into contact with the stator flow passage end portion 253 twice, a flow passage end portion 2431 at a tip end in the rotor seal flow passage sliding direction is brought into contact with the stator flow passage end portion 255 twice, a flow passage end portion 2422 at a end in the rotor seal flow passage sliding direction is brought into contact with the stator flow passage end portion 255 twice, and a flow passage end portion 2421 at a tip end in the rotor seal flow passage sliding direction is brought into contact with the stator flow passage end portion 251 twice.

The stator flow passage end portion 253 is brought into contact with the flow passage end portion 2411 at the tip end in the rotor seal flow passage sliding direction and the flow passage end portion 2432 at the tip end in the rotor seal flow passage sliding direction four times in total. The stator flow passage end portion 251 is brought into contact with the flow passage end portion 2412 at the tip end in the rotor seal flow passage sliding direction and the flow passage end portion 2421 at the tip end in the rotor seal flow passage sliding direction four times in total. The stator flow passage end portion 255 is brought into contact with the flow passage end portion 2422 at the tip end in the rotor seal flow passage sliding direction and the flow passage end portion 2431 at the tip end in the rotor seal flow passage sliding direction and scraped four times in total.

The stator flow passage end portion 252, the stator flow passage end portion 254, and the stator flow passage end portion 256 are not scraped since the stator flow passage end portions are not brought into contact with the flow passage end portion 2411 at the tip end in the rotor seal flow passage sliding direction, the flow passage end portion 2412 at the tip end in the rotor seal flow passage sliding direction, the flow passage end portion 2421 at the tip end in the rotor seal flow passage sliding direction, the flow passage end portion 2422 at the tip end in the rotor seal flow passage sliding direction, the flow passage end portion 2431 at the tip end in the rotor seal flow passage sliding direction, and the flow passage end portion 2432 at the tip end in the rotor seal flow passage sliding direction. In this way, the portions where the stator flow passage end portions and the rotor seal flow passage end portions come into contact with each other is biased in the stator flow passage end portions and the rotor seal flow passage end portions. As a result, the liquid tightness of the stator flow passages and the rotor seal flow passages is impaired.

Therefore, in the present embodiment, the flow passage end portions at the tip ends in the rotor seal flow passage sliding direction slide after being positioned in an opposite direction of the sliding direction of the stator flow passage end portions connected at the start of sliding.

A switching operation of the flow passage switching valve and a rotation operation of the rotor seal according to the present embodiment will be described with reference to FIGS. 5A to 5D. Here, the clockwise direction of the rotation operation of the rotor seal is defined as a plus direction of the sliding direction 29. As shown in FIG. 5A, when the rotor seal flow passage 241, the rotor seal flow passage 243, and the rotor seal flow passage 242 rotate counterclockwise for 2 degrees (2°) from a state of being respectively connected to the stator flow passage end portion 251 and the stator flow passage end portion 252, the stator flow passage end portion 253 and the stator flow passage end portion 254, and the stator flow passage end portion 255 and the stator flow passage end portion 256 (FIG. 5B), the flow passage end portion 2411 at the tip end of the rotor seal flow passage is positioned on a minus side of the stator flow passage end portion 252 in a rotation direction. An angle driven counterclockwise may be larger than 0 degrees (0°) and equal to or smaller than 10 degrees (10°). 2 degrees (2°) to 4 degrees (4°) is desirable. When the angle is larger than 10 degrees (10°), an area where the stator flow passages and the rotor seal are connected is small, and the pressure in the flow passages rises, which affects analysis.

Thereafter, when the rotor seal is rotated in the clockwise plus direction by a rotation angle of +60 degrees (60°), which is moved in an opposite direction of the sliding direction, the process proceeds to a state (FIG. 5D) where the rotor seal flow passage 241, the rotor seal flow passage 242, and the rotor seal flow passage 243 are respectively connected to the stator flow passage end portion 252 and the stator flow passage end portion 253, the stator flow passage end portion 254 and the stator flow passage end portion 255, and the stator flow passage end portion 256 and the stator flow passage end portion 251 through FIG. 5C. Thereafter, the rotor seal is moved in the negative direction by the rotation angle of +60 degrees (60°), which is moved in the opposite direction of the sliding direction, and the process proceeds to FIG. 5B through FIG. 5C.

FIG. 6 shows portions to be scraped by the switching operation of FIG. 5.

By the switching operation of FIG. 5, the flow passage end portion 2411 at the tip end in the rotor seal flow passage sliding direction is brought into contact with the stator flow passage end portion 252 and the stator flow passage end portion 253, the flow passage end portion 2412 at the tip end in the rotor seal flow passage sliding direction is brought into contact with the stator flow passage end portion 251 and the stator flow passage end portion 252, the flow passage end portion 2432 at the tip end in the rotor seal flow passage sliding direction is brought into contact with the stator flow passage end portion 253 and the stator flow passage end portion 254, the flow passage end portion 2431 at the tip end in the rotor seal flow passage sliding direction is brought into contact with the stator flow passage end portion 254 and the stator flow passage end portion 255, the flow passage end portion 2422 at the tip end in the rotor seal flow passage sliding direction is brought into contact with the stator flow passage end portion 255 and the stator flow passage end portion 256, and the flow passage end portion 2421 at the tip end in the rotor seal flow passage sliding direction is brought into contact with the stator flow passage end portion 256 and the stator flow passage end portion 251.

As a result, although the number of portions to be scraped is increased as compared with the related art, all the portions are in contact, the portions to be scraped are dispersed, and a height difference of contact surfaces is small even if an amount of abrasion due to contact with the flow passage end portions on the contact surfaces between the stator and the rotor seal is the same. As a result, the life becomes longer.

FIG. 7 shows a schematic view of a flow passage of a liquid chromatograph equipped with the flow passage switching valve 5 of the present embodiment. The operation of a liquid chromatograph 1 and the flow passage switching valve 5 will be described with reference to FIGS. 5 and 7. The liquid chromatograph 1 includes a liquid feeding pump 2, a needle 3, a syringe pump 4, the flow passage switching valve 5, a separation column 6, and a detector 7. The switching operation of the flow passage switching valve 5 will be described with reference to FIGS. 7A and 7B.

Connection ports of the flow passage switching valve 5 are respectively connected to the liquid feeding pump 2, the separation column 6, the needle 3, the syringe pump 4, a needle port 10, and a waste liquid tank 11. First, in FIGS. 7A and 5A, an eluent 9 is delivered to the separation column 6, the detector 7, and the waste liquid tank 16 by the liquid feeding pump 2. Thereafter, the flow passage switching valve 5 is driven from FIG. 5A to FIG. 5B. Then, as shown in FIG. 7A, the syringe pump 4 suctions a sample 8 into the needle 3 and the rotor seal flow passage 242. The needle 3 moves to a cleaning port 14, a cleaning liquid 12 is delivered by a cleaning pump 13 at the cleaning port 14, and the sample adhering to an outer periphery of the needle 3 is cleaned by the cleaning port 14. Thereafter, as shown in FIG. 7B, the needle 3 holding the sample 8 is connected to the needle port 10. Next, the flow passage is switched by rotating the flow passage switching valve 5 by the rotation angle of +60 degrees (60°), which is moved in the opposite direction of the sliding direction, and the flow passage switching valve 5 is as shown in FIG. 5D (FIGS. 7B and 5D).

After the flow passage is switched, the liquid feeding pump 2 is driven to deliver the sample 8 in the needle port 10 to the separation column 6, and the sample 8 is separated by the separation column 6 and then detected by the detector 7.

Then, the eluent is delivered for a few seconds in order to clean the entire flow passage. Finally, the inside of the flow passage switching valve 5 is rotated by the rotation angle of +60 degrees, which is moved in the opposite direction of the sliding direction in the negative direction, and the eluent is allowed to flow for cleaning returning to FIGS. 7A and 5B.

When the cleaning is completed, FIGS. 7A and 7B are repeated for the analysis of another sample.

FIG. 8 shows a cleaning process of the flow passage switching valve 5 according to the present embodiment.

FIG. 8A is an exploded view of a cross section of FIG. 5A.
FIG. 8B is an exploded view of a cross section of FIG. 5B.
FIG. 8C is an exploded view of a cross section of FIG. 5C.
FIG. 8D is an exploded view of a cross section of FIG. 5D.

In a structure of FIG. 8A, after cleaning by delivering the cleaning liquid or the eluent in a flow direction 100, there may be remaining samples 61, 62, 63, 64, 65, 66 in the flow passage end portion 2411 at the tip end in the rotor seal flow passage sliding direction, the flow passage end portion 2412 at the tip end in the rotor seal flow passage sliding direction, the flow passage end portion 2421 at the tip end in the rotor seal flow passage sliding direction, the flow passage end portion 2422 at the tip end in the rotor seal flow passage sliding direction, the flow passage end portion 2431 at the tip end in the rotor seal flow passage sliding direction, and the flow passage end portion 2432 at the tip end in the rotor seal flow passage sliding direction. When the cleaning liquid or the eluent moves as shown in FIG. 8B, the remaining samples 62, 64, 66 are arranged near central portions of the stator flow passages, and the samples 62, 64, 66 flow downstream in the flow direction 100. Similarly, by repeating processes of FIGS. 8C to 8D, the samples 61, 63, and 65 flow downstream in the flow direction 100, and the carryover is reduced.

According to the present embodiment as described above, it is possible to provide a long-life flow passage switching valve that reduces abrasion caused by sliding of flow passage end portions of a stator and flow passage end portions of a rotor seal, and a liquid chromatograph having the flow passage switching valve.

Since the positions where the flow passage end portions of the stator and the flow passage end portions of the rotor seal are in contact with each other are dispersed, local abrasion of the flow passage end portions of the stator and the rotor seal is reduced and the life of the stator and the rotor seal can be prolonged.

In addition, since the flow passage end portions of the rotor seal are arranged on the minus side of the end portions of the stator flow passages and are delivered with liquid or cleaned, the eluent or the cleaning liquid can flow to the flow passage end portions of the rotor seal, the sample remaining at the flow passage end portions of the rotor seal can be cleaned, and the carry over can be reduced.

Second Embodiment

FIG. 9 is a top view of a contact surface between a stator and a rotor seal of a flow passage switching valve of a second embodiment according to another embodiment of the invention.

As shown in FIG. 9, although the rotor seal flow passages are the same as those of the first embodiment, positions of the stator flow passage end portion 252, the stator flow passage end portion 254, and the stator flow passage end portion 256 are shifted in the sliding direction of the rotor seal flow passages, a distance between centers of the stator flow passage 251 and the stator flow passage 252, a distance between centers of the stator flow passage 253 and the stator flow passage 254, a distance between centers of the stator flow passage 255 and the stator flow passage 256 are longer than a distance between centers of the stator flow passage 251 and the stator flow passage 256, a distance between centers of the stator flow passage 252 and the stator flow passage 253, and a distance between centers of the stator flow passage 254 and the stator flow passage 255.

By shifting positions of the stator flow passages, the flow passage end portion 2411 at the tip end of the rotor seal in the sliding direction, the flow passage end portion 2421 at the tip end of the rotor seal in the sliding direction, and the flow passage end portion 2431 at the tip end of the rotor seal in the sliding direction are arranged on minus sides in the sliding direction of the stator flow passage end portion 252, the stator flow passage end portion 254, and the stator flow passage end portion 256. When the switching operation is performed in this arrangement, the abrasion of the stator flow passage end portions and the rotor seal flow passage end portions is reduced, and the life of the valve becomes long.

In a direction in which the stator flow passages are shifted, the same effect can be obtained with a stator flow passage 2521 shifted toward an outer peripheral direction of the rotor seal and a stator flow passage 2522 shifted toward a center direction of the rotor seal.

As described above, according to the present embodiment, in addition to the effect of the first embodiment, it is possible to further prolong the life of the flow passage switching valve.

Third Embodiment

FIG. 10A is a top view of a contact surface between a stator and a rotor seal of a flow passage switching valve of a third embodiment according to another embodiment of the invention. FIG. 10B is a switching operation view of the flow passage switching valve of the present embodiment.

A long side 2413 of the rotor seal is shorter than the long side of the rotor seal flow passage of the first embodiment described above, and is longer than the center distance between the stator flow passage end portion 251 and the stator flow passage end portion 252. A short side 2414 of the rotor seal and a short side 2415 of the rotor seal may not have the same length. In order to perform switching as shown in FIG. 10B, the number of times of contact between the stator flow passage end portion 251, the stator flow passage end portion 253, and the stator flow passage end portion 255, and the rotor seal flow passage end portion 2411, the rotor seal flow passage end portions 2412 and 2421, the rotor seal flow passage end portion 2422, the rotor seal flow passage end portion 2431, and the rotor seal flow passage end portion 2432 is halved. The flow passage end portion 2411 at the tip end in the rotor seal flow passage sliding direction is brought into contact with the stator flow passage end portion 252 and the stator flow passage end portion 253, the flow passage end portion 2412 at the tip end in the rotor seal flow passage sliding direction is brought into contact with the stator flow passage end portion 251 and the stator flow passage end portion 252, the flow passage end portion 2432 at the tip end in the rotor seal flow passage sliding direction is brought into contact with the stator flow passage end portion 253 and the stator flow passage end portion 254, the flow passage end portion 2431 at the tip end in the rotor seal flow passage sliding direction is brought into contact with the stator flow passage end portion 254 and the stator flow passage end portion 255, the flow passage end portion 2422 at the tip end in the rotor seal flow passage sliding direction is brought into contact with the stator flow passage end portion 255 and the stator flow passage end portion 256, and the flow passage end portion 2421 at the tip end in the rotor seal flow passage sliding direction is brought into contact with the stator flow passage end portion 256 and the stator flow passage end portion 251.

The stator flow passage end portion 252 is brought into contact with the flow passage end portion 2411 at the tip end in the rotor seal flow passage sliding direction and the flow passage end portion 2412 at the tip end in the rotor seal flow passage sliding direction, the stator flow passage end portion 254 is brought into contact with the flow passage end portion 2431 at the tip end in the rotor seal flow passage sliding direction and the flow passage end portion 2432 at the tip end in the rotor seal flow passage sliding direction, and the stator flow passage end portion 256 is brought into contact with the flow passage end portion 2421 at the tip end in the rotor seal flow passage sliding direction and the flow passage end portion 2421 at the tip end in the rotor seal flow passage sliding direction. Since the number of times of contact is halved, the life becomes long. Although the number of portions to be scraped is increased as compared with the related art, the entire stator flow passage end portions 251 to 256 are contacted without biasing, the portions to be scraped are dispersed, and the number of contact is reduced. Therefore, the amount of the abrasion due to contact with the flow passage end portions on the contact surface between the stator and the rotor seal is reduced. As a result, the life is further longer.

The present embodiment describes an aspect that distances between the centers of the stator flow passages arranged adjacent to each other on a circumference is substantially the same. However, the invention is not limited thereto, and the distances between the centers of the stator flow passages arranged adjacent to each other on the circumference may be different from each other, that is, there are a plurality of distances between the centers of a pair of adjacent stator flow passages. In this case, one having the longest distance between the centers maybe used as a reference. In other words, the long side of the rotor seal flow passage may be longer than those having the longest distance between the centers of the stator flow passages, and the flow passage end portions at both ends of the rotor seal flow passage may be arranged in the direction opposite to the sliding direction of the stator flow passage end portions.

As described above, according to the present embodiment, in addition to the effect of the first embodiment, it is possible to further increase the life of the flow passage switching valve.

Fourth Embodiment

FIG. 11A is a cross-sectional view of the stator of the flow passage switching valve according to the first embodiment described above. FIG. 11B is a cross-sectional view of a stator of a flow passage switching valve of a fourth embodiment according to another embodiment of the invention.

In order to prevent damage to the stator and the rotor seal, flow passage end portions 80 to 83 of an opening of a stator flow passage that comes into contact with the rotor seal of FIG. 11A may be chamfered like flow passage end portions 90 to 93 of FIG. 11B. By chamfering, stress concentration at the stator flow passage end portions can be reduced, the abrasion of the stator flow passage end portions and the rotor seal flow passage end portions is small, and the life is long.

The invention is not limited to the above-descried embodiments and includes various modifications.

For example, the embodiments described above have been described in detail for easy understanding of the invention, and the invention is not necessarily limited to those including all configurations described above. A part of a configuration of one embodiment can be replaced with a configuration of another embodiment, and a configuration of another embodiment can be added to a configuration of one embodiment.

REFERENCE SIGN LIST

1: Liquid chromatograph
2: Liquid feeding pump
3: Needle
4: Syringe pump
5: Flow passage switching valve
6: Separation column
7: Detector
8: Sample
9: Eluent
10: Needle port
11: Waste liquid tank
12: Cleaning Liquid
13: Cleaning pump
14: Cleaning port
21: Stator
22: Rotor seal
23: Rotor
241, 242, 243: Rotor seal flow passage
26: Housing
27: Positioning window
28: Positioning hole
2413, 2423, 2433: Rotor seal flow passage end portion
2411, 2412, 2421, 2422, 2431, 2432: Flow passage end portion at tip end in rotor seal flow passage sliding direction
251, 252, 253, 254, 255, 256: Stator flow passage end portion
31, 32, 33, 34, 35, 36: Stator flow passage
61, 62, 63, 64, 65, 66: Sample
80, 81, 82, 83: Flow passage end portion
90, 91, 92, 93: Flow passage end portion

The invention claimed is:

1. A flow passage switching valve comprising:
a stator; and
a rotor seal connected with a rotor configured to rotate and slide on a circumference with respect to the stator,
wherein the stator has a plurality of stator flow passages that open to the rotor seal,
wherein the rotor seal has a rotor seal flow passage for coupling two or more stator flow passages among the plurality of stator flow passages, and
wherein the rotor seal flow passage is temporarily fixed in an offset a position deviated −2 degrees to −4 degrees from an initial state in which the rotor seal flow passage and respective end portions of the two or more stator flow passages are fully open such that in the deviated position, one of the two or more stator flow passages is partially blocked by the rotor seal.

2. The flow passage switching valve according to claim 1, wherein distances between centers of the stator flow passages located adjacent to each other on the circumference are substantially equal to one another.

3. The flow passage switching valve according to claim 1, wherein distances between centers of the stator flow passages located adjacent to each other on the circumference are different.

4. A liquid chromatograph comprising:
a liquid feeding pump;
a needle;
a syringe pump;
a flow passage switching valve;
a flow separation column; and
a detector,
wherein the flow passage switching valve includes:
    a stator; and
    a rotor seal connected with a rotor configured to rotate and slide on a circumference with respect to the stator,
wherein the stator has a plurality of stator flow passages that open to the rotor seal,
wherein the rotor seal has a rotor seal flow passage for coupling two or more stator flow passages among the plurality of stator flow passages, and
wherein the rotor seal flow passage is temporarily fixed in an offset position a position deviated −2 degrees to −4 degrees from an initial state in which the rotor seal flow passage and respective end portions of the two or more stator flow passages are fully open such that in the deviated position, one of the two or more stator flow passages is partially blocked by the rotor seal.

5. The liquid chromatograph according to claim 4, wherein in the flow passage switching valve, distances between centers of the stator flow passages located adjacent to each other on the circumference are substantially equal to one another.

6. The liquid chromatograph according to claim 4, wherein in the flow passage switching valve, distances between centers of the stator flow passages located adjacent to each other on the circumference are different.

* * * * *